United States Patent
Harata et al.

(10) Patent No.: US 11,600,817 B2
(45) Date of Patent: Mar. 7, 2023

(54) PRODUCTION METHOD FOR PRODUCING SILICON CLATHRATE II

(71) Applicants: KABUSHIKI KAISHA TOYOTA JIDOSHOKKI, Kariya (JP); TOYOTA JIDOSHA KABUSHIKI KAISHA, Toyota (JP)

(72) Inventors: Masanori Harata, Kariya (JP); Jun Yoshida, Mishima (JP); Kazuhiro Suzuki, Hadano (JP); Daichi Kosaka, Toyota (JP); Shinji Nakanishi, Shizuoka-ken (JP)

(73) Assignees: KABUSHIKI KAISHA TOYOTA JIDOSHOKKI, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 247 days.

(21) Appl. No.: 17/002,408

(22) Filed: Aug. 25, 2020

(65) Prior Publication Data
US 2021/0066714 A1 Mar. 4, 2021

(30) Foreign Application Priority Data

Aug. 27, 2019 (JP) .............................. JP2019-154849

(51) Int. Cl.
| | | |
|---|---|---|
| *H01M 4/38* | (2006.01) | |
| *H01M 10/0525* | (2010.01) | |
| *H01M 10/058* | (2010.01) | |
| *C01B 33/037* | (2006.01) | |

(Continued)

(52) U.S. Cl.
CPC ........... *H01M 4/386* (2013.01); *C01B 33/037* (2013.01); *C22C 24/00* (2013.01); *H01M 4/381* (2013.01); *H01M 10/058* (2013.01); *H01M 10/0525* (2013.01); *C01P 2002/54* (2013.01); *C01P 2002/72* (2013.01); *C01P 2006/40* (2013.01); *H01M 2004/027* (2013.01)

(58) Field of Classification Search
CPC ................. H01M 4/381; H01M 4/386; H01M 2004/027; H01M 10/058; C01B 33/037; C22C 24/00
See application file for complete search history.

(56) References Cited

U.S. PATENT DOCUMENTS

| | | | | |
|---|---|---|---|---|
| 2015/0376016 A1* | 12/2015 | Krishna | ................ | C01B 33/037 252/62.3 T |
| 2015/0380724 A1* | 12/2015 | Chan | .................... | H01M 4/131 429/50 |

FOREIGN PATENT DOCUMENTS

JP 2012-224488 A 11/2012

OTHER PUBLICATIONS

Hiro-Omi Horie et al. "Controlled thermal decomposition of NaSi to derive silicon clathrate compounds", Journal of Solid State Chemistry, Jan. 2009, pp. 129-135, vol. 182, Issue 1.

(Continued)

*Primary Examiner* — Brittany L Raymond
(74) *Attorney, Agent, or Firm* — Sughrue Mion, PLLC (57) ABSTRACT

Provided is a novel production method for producing silicon clathrate II. In the production method for producing silicon clathrate II, in a reaction system in which a Na—Si alloy containing Na and Si and an Na getter agent coexist so as not to be in contact with each other, the Na—Si alloy is heated and Na evaporated from the Na—Si alloy is thus caused to react with the Na getter agent to reduce an amount of Na in the Na—Si alloy.

13 Claims, 2 Drawing Sheets

(51) Int. Cl.
*C22C 24/00* (2006.01)
*H01M 4/02* (2006.01)

(56) References Cited

OTHER PUBLICATIONS

Krishna, L. et al., "Efficient route to phase selective synthesis of type II silicon clathrates with low sodium occupancy", CrystEngComm, 2014, 16, 3940-3949 ( 10 pages total).
Communication dated Aug. 17, 2021, from the Japanese Patent Office in application No. 2019154849.

* cited by examiner

PRODUCTION METHOD FOR PRODUCING SILICON CLATHRATE II

TECHNICAL FIELD

The present invention relates to a production method for producing silicon clathrate II.

BACKGROUND ART

A compound called a silicon clathrate that contains another metal in a space in a polyhedron formed by Si, is known. Among the silicon clathrates, researches on silicon clathrates I and silicon clathrates II are mainly reported.

The silicon clathrate I is represented by composition formula $Na_8Si_{46}$ in which a dodecahedron having 20 Si atoms and one Na atom enclosed by the 20 Si atoms and a tetradecahedron having 24 Si atoms and one Na atom enclosed by the 24 Si atoms have faces that are common to both. All of the polyhedral cages of the silicon clathrate I contain Na.

The silicon clathrate II is represented by composition formula $Na_xSi_{136}$ in which a dodecahedron formed by Si and a hexadecahedron formed by Si have faces that are common to both. x satisfies $0 \leq x \leq 24$. That is, the polyhedral cage of the silicon clathrate II contains Na or does not contain Na.

H. Horie, T. Kikudome, K. Teramura, and S. Yamanaka, Journal of Solid State Chemistry, 182, 2009, pp. 129-135 (Non-Patent Literature 1) describes a method for producing the silicon clathrate I and the silicon clathrate II from an Na—Si alloy that contains Na and Si. Specifically, according to Non-Patent Literature 1, under a reduced-pressure condition in which the pressure was less than $10^{-4}$ Torr (that is, less than $1.3 \times 10^{-2}$ Pa), the Na—Si alloy was heated to a temperature of 400° C. or higher to remove Na as vapor, thereby producing the silicon clathrate I and the silicon clathrate II. Furthermore, Non-Patent Literature 1 indicates that a production ratio between the silicon clathrate I and the silicon clathrate II varies due to difference in heating temperature, and indicates that a high heating temperature causes separation of Na from the silicon clathrate I to change the structure of the silicon clathrate I, so that a typical Si crystal having a diamond structure is formed.

Furthermore, Non-Patent Literature 1 indicates that $Na_{22.56}Si_{136}$, $Na_{17.12}Si_{136}$, $Na_{18.72}Si_{136}$, $Na_{7.20}Si_{136}$, $Na_{11.04}Si_{136}$, $Na_{1.52}Si_{136}$, $Na_{23.36}Si_{136}$, $Na_{24.00}Si_{136}$, $Na_{20.48}Si_{136}$, $Na_{16.00}Si_{136}$, and $Na_{14.80}Si_{136}$ were produced as the silicon clathrate II.

JP2012-224488A (Patent Literature 1) also discloses a method for producing a silicon clathrate.

Specifically, Patent Literature 1 indicates that an Na—Si alloy produced by using a silicon wafer and Na was heated at 400° C. for three hours under a reduced-pressure condition in which the pressure was not higher than $10^{-2}$ Pa, to remove Na, thereby producing the silicon clathrate I and the silicon clathrate II.

The silicon clathrate II in which Li, K, Rb, Cs, or Ba substitutes for Na contained in the silicon clathrate II, and the silicon clathrate II in which Ga or Ge partially substitutes for Si in the silicon clathrate II are also reported.

SUMMARY OF INVENTION

Technical Problem

The silicon clathrate II maintains the structure even in a case where the contained Na has separated. The inventor of the present invention has focused on this fact and conceived of utilizing the silicon clathrate II from which the contained Na has separated, as a negative electrode active material for a lithium ion secondary battery.

According to the above-described conventional art, great pressure reduction (high degree of vacuum) is required as a reduced-pressure condition for producing the silicon clathrate II. Furthermore, for discharging Na as vapor from the Na—Si alloy to the outside of the system, a specific device for Na to be discharged needs to be provided. Therefore, the method for producing the silicon clathrate II as described in Non-Patent Literature 1 and Patent Literature 1 is not necessarily efficient from an industrial viewpoint.

The present invention has been made in view of such circumstances, and an object of the present invention is to provide a novel production method for producing silicon clathrate II.

Solution to Problem

The inventor of the present invention has examined a method for efficiently producing the silicon clathrate II, and has consequently considered that vapor of Na is trapped in a reaction system. By trapping vapor of Na in the reaction system, a partial pressure of Na is assumed to be reduced in the reaction system and a reaction rate is assumed to increase in a desired reaction, and, in addition, great pressure reduction is assumed to be unnecessary as a reduced-pressure condition in the reaction system. Furthermore, an amount of Na discharged to the outside of the reaction system is considered to be substantially reduced.

The inventor of the present invention has found that, in an experiment in an environment in which an Na—Si alloy and a material (in the present specification, referred to as "Na getter agent") that reacts with Na coexist, a desired reaction progresses even in a condition in which pressure reduction is small, an amount of Na discharged to the outside of the reaction system is reduced, and the silicon clathrate II is preferentially produced.

The present invention has been completed based on the above-described findings.

A production method for producing silicon clathrate II according to the present invention is directed to a production method for producing silicon clathrate II in which, in a reaction system in which a Na—Si alloy containing Na and Si and an Na getter agent coexist so as not to be in contact with each other, the Na—Si alloy is heated and Na evaporated from the Na—Si alloy is thus caused to react with the Na getter agent to reduce an amount of Na in the Na—Si alloy.

In the production method for producing the silicon clathrate II according to the present invention, great pressure reduction is not necessarily required as a reduced-pressure condition, and vapor of Na reacts with the Na getter agent and is thus captured in the reaction system. Therefore, the production method for producing the silicon clathrate II according to the present invention is suitable for large-scale production and industrialization of the silicon clathrate II. Furthermore, in the production method for producing the silicon clathrate II according to the present invention, the silicon clathrate II is preferentially produced. Therefore, a silicon material that contains the silicon clathrate II and is suitable for a negative electrode active material for a power storage device such as a secondary battery is also produced.

In the present specification, a material containing the silicon clathrate II is also referred to as a silicon material

DESCRIPTION OF EMBODIMENTS

The following describes embodiments of the present invention. Unless mentioned otherwise in particular, a numerical value range of "x to y" described in the present specification includes, in the range thereof, a lower limit "x" and an upper limit "y". A numerical value range can be formed by arbitrarily combining such upper limit values, lower limit values, and numerical values described in Examples. In addition, numerical values arbitrarily selected within a numerical value range can be used as upper limit and lower limit numerical values.

In the production method (hereinafter, simply referred to also as "the production method of the present invention") for producing silicon clathrate II according to the present invention, in a reaction system in which an Na—Si alloy containing Na and Si and an Na getter agent coexist so as not to be in contact with each other, the Na—Si alloy is heated, whereby Na evaporated from the Na—Si alloy is caused to react with the Na getter agent to reduce an amount of Na in the Na—Si alloy.

The technical significance of the production method of the present invention is that gaseous Na (g) in the following reaction formula is captured by the Na getter agent in the reaction system to cause the reaction to advantageously progress toward the right side of the following reaction formula. In the production method of the present invention, the reaction progresses under the condition that the Na partial pressure is relatively low. Therefore, advantageously, generation of the silicon clathrate I is inhibited and the silicon clathrate II is preferentially produced.

In the Na—Si alloy, the composition of Na and Si is represented by $Na_ySi_{136}$ (24<y). The Na—Si alloy is preferably an Na—Si alloy in which an amount of Na is excessively greater than an amount of Si, that is, an Na—Si alloy in which the composition of Na and Si is represented by $Na_zSi$ (1<z).

For producing the Na—Si alloy, Na and Si are melted in an inert gas atmosphere to form the alloy.

The Na—Si alloy is allowed to contain another element other than Na and Si within the gist of the present invention. Examples of the other element include Li, K, Rb, Cs, and Ba that substitute for Na in the silicon clathrate II, and Ga and Ge that substitute for Si in the silicon clathrate II.

The Na getter agent refers to a material that reacts with 0-valent Na. In view of the technical significance of the production method of the present invention, the Na getter agent refers to a material that reacts with 0-valent Na and has a vapor pressure lower than a vapor pressure of Na in metal form.

By using the Na getter agent having excellent reactivity with Na, the heating temperature is reduced in the production method of the present invention, and the gentle reduced-pressure condition is used.

Examples of the Na getter agent include metal oxides other than alkali metals and alkaline-earth metals, metal sulfides other than alkali metals and alkaline-earth metals, and metal halides other than alkali metals and alkaline-earth metals.

Specific examples of the Na getter agent include $WO_2$, $WO_3$, $MoO_3$, $ZnO$, $FeO$, $VO$, $V_2O_3$, $TiO_2$, $SiO$, $SiO_2$, $Al_2O_3$, $WS_2$, $MoS_2$, $ZnS$, $FeS$, $TiS_2$, $SiS_2$, and $Al_2S_3$. Among them, the Na getter agent selected from $WO_3$, $MoO_3$, $ZnO$, $FeO$, $V_2O_3$, $TiO_2$, $SiO$, and $Al_2O_3$ is preferable, and the Na getter agent selected from $WO_3$, $MoO_3$, $FeO$, and $TiO_2$ is more preferable.

Reaction of the preferable Na getter agent with Na progresses even under a condition that the partial pressure of Na is low. Table 1 indicates the partial pressure of Na at a point of time when the reaction represented by the following reaction formula has reached equilibrium under the condition that a molar ratio between Na and the Na getter agent in the system is almost 1:1 and the temperature in the system is 350° C.

TABLE 1

| Na getter agent | Na partial pressure |
|---|---|
| $WO_3$ | $10^{-22.4}$ atm |
| $MoO_3$ | $10^{-26.3}$ atm |
| $ZnO$ | $10^{-6.5}$ atm |
| $FeO$ | $10^{-14.7}$ atm |
| $V_2O_3$ | $10^{-10.3}$ atm |
| $TiO_2$ | $10^{-15.9}$ atm |
| $SiO$ | $10^{-10.5}$ atm |
| $Al_2O_3$ | $10^{-5.5}$ atm |

An amount of the Na getter agent to be used is determined as appropriate according to an amount of Na contained in the Na—Si alloy. One kind of the Na getter agent is used or a plurality of kinds of the Na getter agents are used in combination.

In the production method of the present invention, use of the Na getter agent allows a desired reaction to progress even under the condition in which the pressure reduction is gentler, and allows a desired reaction to progress even at a lower heating temperature, as compared with a conventional method for producing the silicon clathrate II.

Under the reduced-pressure condition, an air pressure P satisfies, for example, $P<10^5$ Pa, $P\leq10^4$ Pa, $P\leq10^3$ Pa, $P\leq10^2$ Pa, or $P\leq10$ Pa. For example, the air pressure P advantageously satisfies $10^{-2}$ Pa$<P<10^5$ Pa, $10^{-1}$ Pa$\leq P\leq10^4$ Pa, or 10 Pa$<P\leq10^2$ Pa as compared with a conventional method for producing the silicon clathrate II.

A heating temperature t depends on the reduced-pressure condition. However, the heating temperature t preferably satisfies, for example, 100° C.$\leq t\leq$500° C., 200° C.$\leq t\leq$400° C., or 250° C.$\leq t\leq$350° C. In a case where the heating temperature t is low, the air pressure P needs to be reduced.

The silicon clathrate II is suitable for a negative electrode active material of a power storage device such as a secondary battery. In a case where a silicon material containing such silicon clathrate II is produced, the heating temperature t is preferably not higher than 400° C. In a case where the heating temperature t is not higher than 400° C., generation of a Si crystal having a diamond structure is inhibited, and a silicon material having favorable physical properties is obtained.

In the production method of the present invention, a step of causing Na to react with the Na getter agent to reduce an amount of Na in the Na—Si alloy is performed as a single step to produce the silicon clathrate II, or the silicon clathrate II obtained in the above-described step and a new Na getter agent are caused to coexist without coming into contact with each other and the silicon clathrate II is heated to produce the silicon clathrate II having a reduced amount of Na.

The following invention is achieved according to the above description.

A production method for producing silicon clathrate II represented by composition formula $Na_{x2}Si_{136}$ in which, in a reaction system in which the silicon clathrate II represented by composition formula $Na_{x1}Si_{136}$ and the Na getter agent coexist so as not to be in contact with each other, the silicon clathrate II is heated, and Na evaporated from the silicon clathrate II is caused to react with the Na getter agent to reduce an amount of Na in the silicon clathrate II.

x1 and x2 satisfy $0<x1\leq 24$, $0\leq x2<24$, and $x2<x1$.

The silicon material is used as a negative electrode active material for a power storage device such as a secondary battery including a lithium ion secondary battery, an electric double layer capacitor, and a lithium ion capacitor. The lithium ion secondary battery includes a positive electrode, a negative electrode, an electrolytic solution, and a separator, or includes a positive electrode, a negative electrode, and a solid electrolyte.

In a case where the silicon material is used as the negative electrode active material, a content of Na in the silicon clathrate II is preferably small, because a charge carrier such as lithium is movable into a polyhedral cage of the silicon clathrate II from which Na has been removed, so that expansion of the negative electrode active material is inhibited.

In a case where the silicon material is used as the negative electrode active material, a range of x in composition formula $Na_xSi_{136}$ for the silicon clathrate II is preferably $0\leq x\leq 10$, more preferably $0\leq x\leq 7$, still more preferably $0\leq x\leq 5$, even more preferably $0\leq x\leq 3$, particularly preferably $0\leq x\leq 2$, and most preferably $0\leq x\leq 1$.

The silicon material is also applicable to be used for a thermoelectric element, a light-emitting element, a light absorbing element, and the like as described in Patent Literature 1.

Na, NaOH, or the like is likely to attach to the silicon material containing the silicon clathrate II produced in the production method of the present invention. Therefore, a step of cleaning the silicon material with water in order to remove Na, NaOH, or the like is preferably performed.

By cleaning the silicon material with water, the surface of the silicon material is partially oxidized and oxygen is expected to be introduced into the silicon material. The silicon material into which oxygen has been introduced is expected to enhance stability and enhance performance as a negative electrode active material.

As water to be used in the cleaning step, an acidic aqueous solution is preferably used from the viewpoint that Na, NaOH, or the like is easily dissolved. The concentration of the acid in the acidic aqueous solution is preferably 0.1 to 10 mass %, more preferably 0.5 to 5 mass %, and even more preferably 1 to 4 mass %.

After the cleaning step, water is preferably removed from the silicon material by filtering and drying.

The silicon material is preferably pulverized and classified to form powder having a uniform particle size distribution.

The mean particle diameter of the silicon material is preferably in a range of 1 to 30 μm, more preferably in a range of 2 to 20 μm, and even more preferably in a range of 3 to 15 μm. The mean particle diameter refers to a value of $D_{50}$ obtained when a sample is measured by a typical laser diffraction type particle-size-distribution measuring device.

Although the embodiments of the present invention have been described above, the present invention is not limited to the embodiments. Without departing from the gist of the present invention, the present invention can be implemented in various modes with modifications and improvements, etc., that can be made by a person skilled in the art.

EXAMPLES

The present invention will be more specifically described below by presenting examples, comparative examples, and the like. The present invention is not limited to these examples.

Example 1

Producing Na—Si Alloy

Na and Si were melted under an inert gas atmosphere and cooled to produce an Na—Si alloy. In the Na—Si alloy, a composition ratio of Na to Si was slightly high.

Producing Silicon Clathrate II 1 part by mass of SiO powder was placed as the Na getter agent on the inside bottom of a reaction vessel made of stainless steel. A crucible made of stainless steel was disposed on the upper portion of a base provided on the inside bottom of the reaction vessel made of the stainless steel. 1 part by mass of the Na—Si alloy was placed in the crucible.

The reaction vessel made of the stainless steel was lidded by a lid made of stainless steel and the reaction vessel with the lid was disposed in a vacuum furnace. Gas in the reaction vessel was allowed to be discharged through a gap between the reaction vessel made of the stainless steel and the lid made of the stainless steel.

The pressure in the vacuum furnace was reduced to 10 Pa, and the inside of the vacuum furnace was heated at 350° C. for 12 hours to synthesize a silicon material containing silicon clathrate II.

The inside of the vacuum furnace was cooled to room temperature, and the silicon material containing the silicon clathrate II was collected from the crucible. A reaction product obtained by reaction between the Na getter agent and Na on the inside bottom of the reaction vessel was also collected. Deposition of Na in metal form was not observed inside the vacuum furnace and the reaction vessel.

The silicon material was put into 3 mass % of hydrochloric acid and stirred to be cleaned. The cleaned silicon material was separated by filtering, and dried at 80° C. under a reduced pressure to produce the silicon material containing the silicon clathrate II according to example 1.

Evaluation Example 1

X-ray diffraction measurement of the silicon material containing the silicon clathrate II according to example 1 and the reaction product obtained by reaction between the Na getter agent and Na was performed by using a powder X-ray diffractometer.

Figure 1:
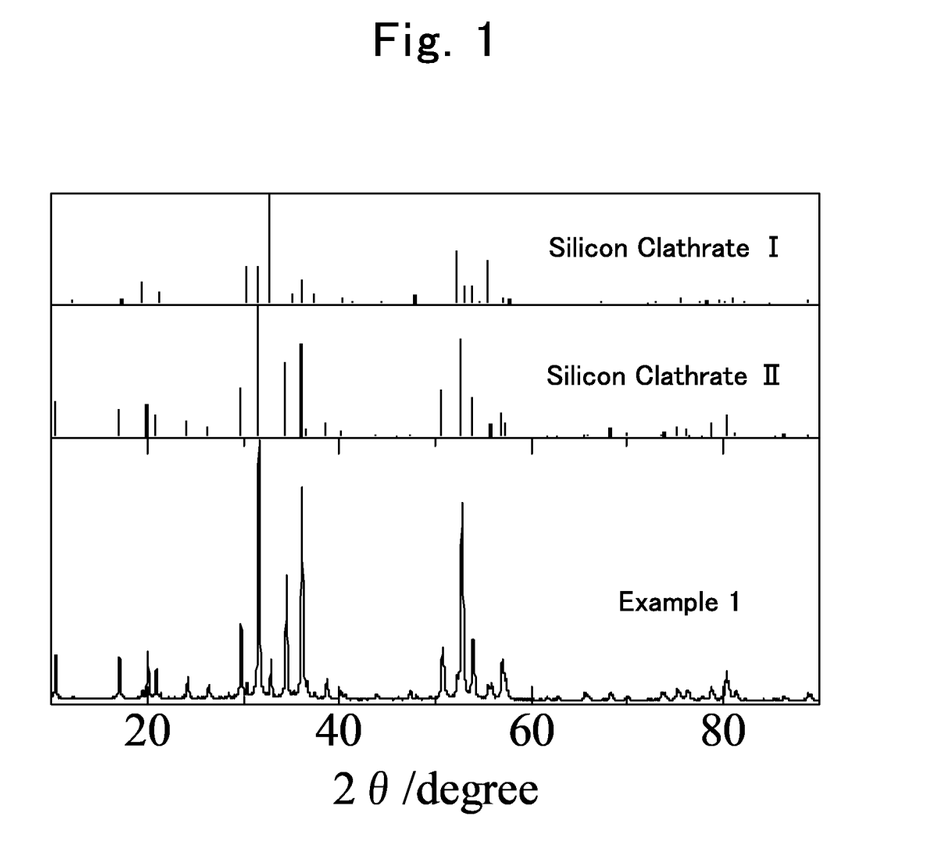
FIG. 1 illustrates an X-ray diffraction chart of a silicon material according to example 1 and X-ray diffraction charts of silicon clathrate I and silicon clathrate II.
Figure 2:
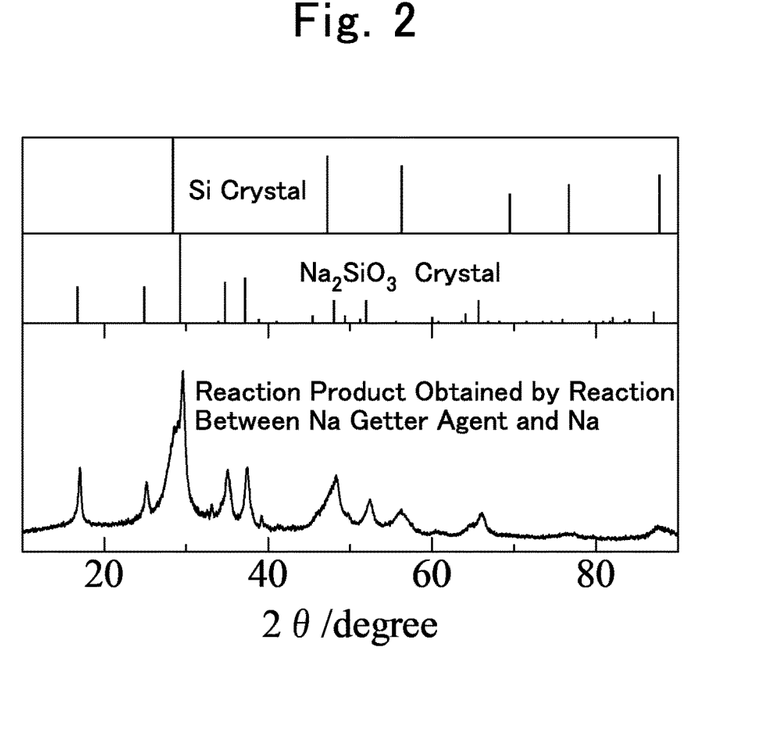
FIG. 2 illustrates an X-ray diffraction chart of a reaction product obtained by reaction between an Na getter agent and Na according to evaluation example 1, and X-ray diffraction charts of an $Na_2SiO_3$ crystal and an Si crystal having a diamond structure.

FIG. 1 illustrates an X-ray diffraction chart of the silicon material according to example 1 and X-ray diffraction charts of the silicon clathrate I and the silicon clathrate II. FIG. 2 illustrates an X-ray diffraction chart of the reaction product obtained by reaction between the Na getter agent and Na and X-ray diffraction charts of an $Na_2SiO_3$ crystal and an Si crystal having a diamond structure.

FIG. 1 indicates that the main component of the silicon material according to example 1 was the silicon clathrate II. FIG. 2 also indicates that SiO as the Na getter agent reacted with Na to produce $Na_2SiO_3$.

Example 2

A silicon material containing the silicon clathrate II according to example 2 was produced in the same method as in example 1 except that synthesizing the silicon material in producing the silicon clathrate II was performed in two steps as described below.

Synthesizing Silicon Material Containing Silicon Clathrate II (First Step)

1 part by mass of SiO powder was placed as the Na getter agent on the inside bottom of a reaction vessel made of stainless steel. A crucible made of stainless steel was disposed on the upper portion of a base provided on the inside bottom of the reaction vessel made of the stainless steel. 1 part by mass of the Na—Si alloy was placed in the crucible. The reaction vessel made of the stainless steel was lidded by a lid made of stainless steel and the reaction vessel with the lid was disposed in a vacuum furnace. The pressure in the vacuum furnace was reduced to 10 Pa, and the inside of the vacuum furnace was heated at 350° C. for 12 hours to synthesize a silicon material containing the silicon clathrate II.

The inside of the vacuum furnace was cooled to room temperature, and the silicon material containing the silicon clathrate II was collected from the crucible.

Synthesizing Silicon Material Containing Silicon Clathrate II (Second Step)

1 part by mass of SiO powder was placed as the Na getter agent on the inside bottom of another reaction vessel made of stainless steel. A crucible made of stainless steel was disposed on the upper portion of a base provided on the inside bottom of the reaction vessel made of the stainless steel. 1 part by mass of the collected silicon material was placed in the crucible. The reaction vessel made of the stainless steel was lidded by a lid made of stainless steel and the reaction vessel with the lid was disposed in a vacuum furnace. The pressure in the vacuum furnace was reduced to 10 Pa, and the inside of the vacuum furnace was heated at 350° C. for 6 hours to synthesize a silicon material containing the silicon clathrate II.

Example 3

A silicon material containing the silicon clathrate II according to example 3 was produced in the same method as in example 2 except that synthesizing the silicon material in the second step in producing the silicon clathrate II was performed at the temperature of 400° C.

Example 4

A silicon material containing the silicon clathrate II according to example 4 was produced in the same method as in example 2 except that synthesizing the silicon material in the second step in producing the silicon clathrate II was performed at the temperature of 400° C. for the heating time of 12 hours.

Example 5

A silicon material containing the silicon clathrate II according to example 5 was produced in the same method as in example 2 except that synthesizing the silicon material in the second step in producing the silicon clathrate II was performed at the temperature of 450° C.

Evaluation Example 2

X-ray diffraction measurement of the silicon material containing the silicon clathrate II according to each of example 1 to example 5 was performed by using a powder X-ray diffractometer. The silicon clathrate II in the silicon material according to example 1 substantially corresponds to the silicon clathrate II synthesized in the first step in producing the silicon material according to example 2 to example 5.

Figure 3:
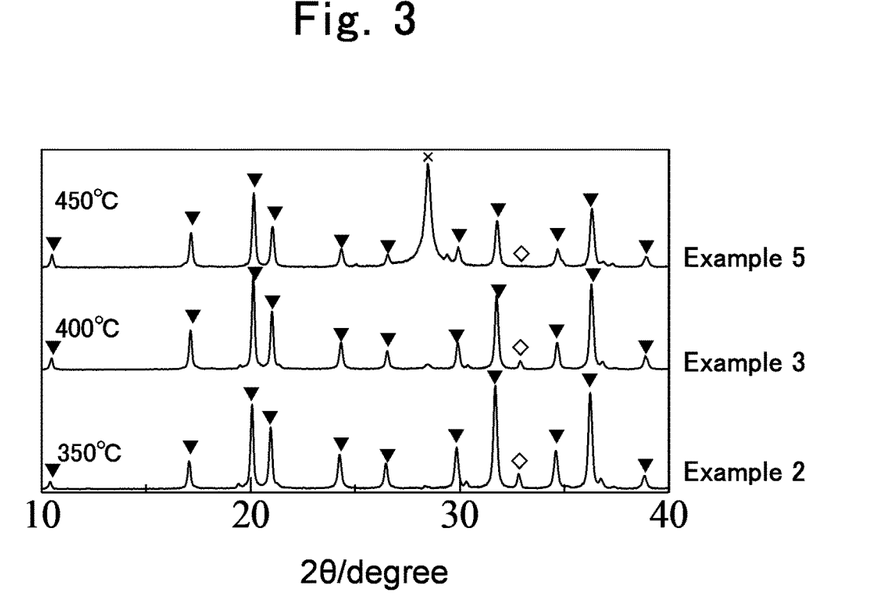
FIG. 3 illustrates an X-ray diffraction chart of a silicon material according to each of example 2, example 3, and example 5.

FIG. 3 illustrates an X-ray diffraction chart of the silicon material according to each of example 2, example 3, and example 5. In FIG. 3, peaks indicated by triangles are derived from the silicon clathrate II, peaks indicated by quadrangles are derived from the silicon clathrate I, and a peak indicated by x is derived from an Si crystal having a diamond structure.

FIG. 3 indicates that the main component of the silicon material according to each of example 2, example 3, and example 5 was the silicon clathrate II. FIG. 3 also indicates that the silicon material of example 5 in which the heating temperature was 450° C., contained an Si crystal having a diamond structure.

The above-described results indicate that the partial pressure of Na was relatively high under the condition that synthesizing the silicon material of example 5 was performed at the heating temperature of 450° C., and a proportion of the silicon clathrate I generated as an intermediate is considered to have been relatively high. The silicon clathrate I is considered to have been turned to an Si crystal according to Na being removed from the silicon clathrate I as the intermediate.

Meanwhile, the partial pressure of Na was relatively low under the condition that synthesizing the silicon material according to each of example 2 and example 3 was performed at the heating temperature of not higher than 400° C., and a proportion of the silicon clathrate I generated as an intermediate was thus relatively low, and the silicon clathrate II is considered to have been preferentially produced.

In the X-ray diffraction chart of the silicon material according to each of example 1 to example 5, a value of x in composition formula $Na_xSi_{136}$ for the silicon clathrate II in each example was calculated based on an intensity of a peak derived from (311) of the silicon clathrate II and an intensity of a peak derived from (511) of the silicon clathrate II. The value of x in composition formula $Na_xSi_{136}$ for the silicon clathrate II has a correlation with the value of a ratio of the intensity of the peak derived from (511) to the intensity of the peak derived from (311).

Table 2 indicates the results.

TABLE 2

| | Synthesizing condition | Value of x |
|---|---|---|
| Example 1 | One step | 22.4 |
| Example 2 | Second step: conditions were 350° C. and 6 hours | 6.8 |
| Example 3 | Second step: conditions were 400° C. and 6 hours | 1.7 |
| Example 4 | Second step: conditions were 400° C. and 12 hours | 1.5 |
| Example 5 | Second step: conditions were 450° C. and 6 hours | 0.6 |

Table 2 indicates that the higher the heating temperature is and the longer the heating time is, the less the value of x in composition formula $Na_xSi_{136}$ for the produced silicon clathrate II is.

Example 6

A silicon material containing the silicon clathrate II according to example 6 was produced in the same method as in example 1 except that synthesizing a silicon material in producing the silicon clathrate II was performed as described below.

$MoO_3$ powder was placed as the Na getter agent on the inside bottom of a reaction vessel made of stainless steel. A crucible made of stainless steel was disposed on the upper portion of a base provided on the inside bottom of the reaction vessel made of the stainless steel. The Na—Si alloy was placed in the crucible. A molar ratio between Na in the Na—Si alloy and the Na getter agent was 4:6.

The reaction vessel made of the stainless steel was lidded by a lid made of stainless steel and the reaction vessel with the lid was disposed in a vacuum furnace.

The pressure in the vacuum furnace was reduced to 10 Pa, and the inside of the vacuum furnace was heated at 280° C. for 40 hours to synthesize a silicon material containing the silicon clathrate II.

Example 7

A silicon material containing the silicon clathrate II according to example 7 was produced in the same method as in example 6 except that the heating temperature was 330° C. and the heating time was 20 hours.

Example 8

A silicon material containing the silicon clathrate II according to example 8 was produced in the same method as in example 6 except that FeO powder was used as the Na getter agent.

Example 9

A silicon material containing the silicon clathrate II according to example 9 was produced in the same method as in example 8 except that the heating temperature was 330° C. and the heating time was 20 hours.

Example 10

A silicon material containing the silicon clathrate II according to example 10 was produced in the same method as in example 8 except that the heating temperature was 380° C. and the heating time was 20 hours.

Example 11

A silicon material containing the silicon clathrate II according to example 11 was produced in the same method as in example 6 except that SiO powder was used as the Na getter agent.

Example 12

A silicon material containing the silicon clathrate II according to example 12 was produced in the same method as in example 11 except that synthesizing the silicon material in producing the silicon clathrate II was performed in two steps as described below.

Synthesizing Silicon Material Containing Silicon Clathrate II (First Step)

SiO powder was placed as the Na getter agent on the inside bottom of a reaction vessel made of stainless steel. A crucible made of stainless steel was disposed on the upper portion of a base provided on the inside bottom of the reaction vessel made of the stainless steel. The Na—Si alloy was placed in the crucible. A molar ratio between Na in the Na—Si alloy and the Na getter agent was 4:6.

The reaction vessel made of the stainless steel was lidded by a lid made of stainless steel and the reaction vessel with the lid was disposed in a vacuum furnace. The pressure in the vacuum furnace was reduced to 10 Pa, and the inside of the vacuum furnace was heated at 280° C. for 40 hours to synthesize a silicon material containing the silicon clathrate II.

The inside of the vacuum furnace was cooled to room temperature, and the silicon material containing the silicon clathrate II was collected from the crucible.

Synthesizing Silicon Material Containing Silicon Clathrate II (Second Step)

SiO powder was placed as the Na getter agent on the inside bottom of another reaction vessel made of stainless steel. A crucible made of stainless steel was disposed on the upper portion of a base provided on the inside bottom of the reaction vessel made of the stainless steel. The collected silicon material was placed in the crucible. A molar ratio between Na in the collected silicon material and the Na getter agent was 4:6.

The reaction vessel made of the stainless steel was lidded by a lid made of stainless steel and the reaction vessel with the lid was disposed in a vacuum furnace. The pressure in the vacuum furnace was reduced to 10 Pa, and the inside of the vacuum furnace was heated at 330° C. for 20 hours to synthesize a silicon material containing the silicon clathrate II.

Example 13

A silicon material containing the silicon clathrate II according to example 13 was produced in the same method as in example 12 except that synthesizing the silicon material in the second step in producing the silicon clathrate II was performed at the temperature of 380° C.

Example 14

A silicon material containing the silicon clathrate II according to example 14 was produced in the same method as in example 12 except that synthesizing the silicon material in the second step in producing the silicon clathrate II was performed at the temperature of 480° C. for the heating time of 6 hours.

Comparative Example 1

A silicon material of comparative example 1 was produced in the same method as in example 1 except that synthesizing the silicon material in producing the silicon clathrate II was performed as described below.

An Na—Si alloy was placed on the inside bottom of a reaction vessel made of stainless steel. The reaction vessel was disposed in a vacuum furnace. The pressure in the vacuum furnace was reduced to 10 Pa, and the inside of the vacuum furnace was heated at 280° C. for 40 hours to synthesize the silicon material. The inside of the vacuum furnace was cooled to room temperature and the silicon material was collected.

Comparative Example 2

A silicon material of comparative example 2 was produced in the same method as in comparative example 1 except that synthesizing the silicon material was performed in two steps as described below.

Synthesizing Silicon Material (First Step)

An Na—Si alloy was placed on the inside bottom of a reaction vessel made of stainless steel. The reaction vessel was disposed in a vacuum furnace. The pressure in the vacuum furnace was reduced to 10 Pa, and the inside of the vacuum furnace was heated at 280° C. for 40 hours to synthesize a silicon material. The inside of the vacuum furnace was cooled to room temperature and the silicon material was collected.

Synthesizing Silicon Material (Second Step)

The collected silicon material was placed on the inside bottom of another reaction vessel made of stainless steel. The reaction vessel was disposed in a vacuum furnace. The pressure in the vacuum furnace was reduced to 10 Pa, and the inside of the vacuum furnace was heated at 380° C. for 20 hours to synthesize the silicon material containing the silicon clathrate II.

Comparative Example 3

A silicon material of comparative example 3 was produced in the same method as in comparative example 2 except that synthesizing the silicon material in the second step was performed at the temperature of 480° C. for the heating time of 6 hours.

Evaluation Example 3

X-ray diffraction measurement of the silicon material containing the silicon clathrate II according to each of example 6 to example 14, and the silicon material according to each of comparative example 1 to comparative example 3 was performed by using a powder X-ray diffractometer.

The results indicate that the silicon material of each of example 6 to example 14 and the silicon material of each of comparative example 2 to comparative example 3 contained the silicon clathrate II. However, a peak derived from the silicon clathrate II was not detected from the silicon material of comparative example 1. The results indicate that the silicon clathrate II was not produced under the production condition in comparative example 1.

Furthermore, in the X-ray diffraction charts of the silicon material in each of example 6 to example 14 and the silicon material in each of comparative example 2 to comparative example 3, a value of x in composition formula $Na_xSi_{136}$ for the silicon clathrate II in each example was calculated based on an intensity of a peak derived from (311) of the silicon clathrate II and an intensity of a peak derived from (511) of the silicon clathrate II.

Table 3 indicates the results thereof.

TABLE 3

| | Na getter agent | Synthesizing condition | Value of x |
|---|---|---|---|
| Example 6 | $MoO_3$ | 280° C. 40 hours | 4.9 |
| Example 7 | $MoO_3$ | 330° C. 20 hours | 3.5 |
| Example 8 | FeO | 280° C. 40 hours | 8.4 |
| Example 9 | FeO | 330° C. 20 hours | 5.8 |
| Example 10 | FeO | 380° C. 20 hours | 1.8 |
| Example 11 | SiO | 280° C. 40 hours | 21.7 |
| Example 12 | SiO | 280° C. 40 hours + 330° C. 20 hours | 9.4 |
| Example 13 | SiO | 280° C. 40 hours + 380° C. 20 hours | 4.8 |
| Example 14 | SiO | 280° C. 40 hours + 480° C. 6 hours | 2.4 |
| Comparative example 1 | — | 280° C. 40 hours | Not measured due to no reaction |
| Comparative example 2 | — | 280° C. 40 hours + 380° C. 20 hours | 16.7 |
| Comparative example 3 | — | 280° C. 40 hours + 480° C. 6 hours | 1.1 |

Table 3 indicates that removal of Na from the Na—Si alloy smoothly progressed under the synthesizing condition in which the Na getter agent was used. Table 3 also indicates that the reaction rate varied depending on the kind of the Na getter agent.

Use of the Na getter agent allowed the reaction to progress at a lower temperature for a shorter time period.

The invention claimed is:

1. A production method for producing silicon clathrate II, wherein, in a reaction system in which a Na-Si alloy containing Na and Si and an Na getter agent coexist so as not to be in contact with each other, the Na-Si alloy is heated and Na evaporated from the Na-Si alloy chemically reacts with the Na getter agent to reduce an amount of Na in the Na-Si alloy.

2. A production method for producing silicon clathrate II represented by composition formula $Na_{x2}Si_{136}$, wherein,
   in a reaction system in which silicon clathrate II represented by composition formula $Na_{x1}Si_{136}$ and an Na getter agent coexist so as not to be in contact with each other,
   the silicon clathrate II is heated and Na evaporated from the silicon clathrate II is thus caused to react with the Na getter agent to reduce an amount of Na in the silicon clathrate II, and
   x1 and x2 satisfy $0<x1\leq24$, $0\leq x2<24$, and $x2<x1$.

3. The production method for producing the silicon clathrate II according to claim 1 or 2, wherein heating is performed under a reduced-pressure condition.

4. The production method for producing the silicon clathrate II according to claim 3, wherein an air pressure P under the reduced-pressure condition satisfies $10^{-2} Pa < P < 10^5$ Pa.

5. The production method for producing the silicon clathrate II according to claim 1 or 2, wherein a heating temperature is not higher than 400° C.

6. The production method for producing the silicon clathrate II according to claim 1 or 2, wherein the Na getter agent is selected from a metal oxide other than an alkali metal and an alkaline-earth metal, a metal sulfide other than an alkali metal and an alkaline-earth metal, and a metal halide other than an alkali metal and an alkaline-earth metal.

7. The production method for producing the silicon clathrate II according to claim 1 or 2, wherein the Na getter agent is selected from $WO_3$, $MoO_3$, ZnO, FeO, $V_2O_3$, $TiO_2$, SiO, and $Al_2O_3$.

8. The production method for producing the silicon clathrate II according to claim 7, wherein the Na getter agent is selected from $MoO_3$, FeO, and SiO.

9. The production method for producing the silicon clathrate II according to claim 1, wherein the Na getter agent is a material that reacts with 0-valent Na.

10. A production method for producing a negative electrode active material, the production method comprising producing the silicon clathrate II by using the production method according to claim 1 or 2.

11. A production method for producing a negative electrode, the production method comprising:
    producing the negative electrode active material by using the production method according to claim 8; and
    producing a negative electrode by using the negative electrode active material.

12. A production method for producing a secondary battery, the production method comprising:
    producing the negative electrode by using the production method according to claim 9; and
    producing a secondary battery by using the negative electrode.

13. A production method for producing silicon clathrate II comprising,
    providing a Na-Si alloy containing Na and Si and an Na getter agent where the Na-Si alloy and Na getter agent coexist so as not to be in contact with each other,
    heating the Na-Si alloy to evaporate Na, and the evaporated Na chemically reacts with the Na getter agent to reduce an amount of Na in the Na-Si alloy.

\* \* \* \* \*